United States Patent [19]
Willars et al.

[11] Patent Number: 5,831,978
[45] Date of Patent: Nov. 3, 1998

[54] METHOD FOR MULTIPLEXING OF PARALLEL INFORMATION STREAMS IN A CDMA SYSTEM

[75] Inventors: Per Hans Åke Willars, Stockholm; Erik Bengt Lennart Dahlman, Bromma, both of Sweden; Karim Jamal, Tokyo, Japan

[73] Assignee: Telefonaktiebolaget L M Ericsson publ., Sweden

[21] Appl. No.: 731,756

[22] Filed: Oct. 18, 1996

[51] Int. Cl.[6] .................................................. H04J 13/00
[52] U.S. Cl. ............................................ 370/335; 370/342
[58] Field of Search ..................................... 370/479, 468, 370/470, 342, 320, 335, 478, 465

[56] References Cited

U.S. PATENT DOCUMENTS

| | | | |
|---|---|---|---|
| 4,029,900 | 6/1977 | Addeo | 370/465 |
| 5,528,593 | 6/1996 | English et al. | 370/391 |
| 5,537,410 | 7/1996 | Li | 375/365 |
| 5,673,266 | 9/1997 | Li | 370/465 |

FOREIGN PATENT DOCUMENTS

| | | |
|---|---|---|
| 0 720 321 A1 | 12/1995 | European Pat. Off. . |
| WO 95/08888 | 3/1995 | WIPO . |
| WO 95/35002 | 12/1995 | WIPO . |

Primary Examiner—Melvin Marcelo
Assistant Examiner—Daniel Song
Attorney, Agent, or Firm—Jenkens & Gilchrist, P.C.

[57] ABSTRACT

The present invention discloses a method for transmitting a plurality of information streams having variable data rates. A plurality of information streams are multiplexed together into a common information frame. The information is channel encoded and multiplexed with a number of overhead bits including encoding information on the multiplexed frame. The multiplexed frame is then demultiplexed into at least one channel frames that are each transmitted over a separate code channel such that the first code channel always includes the overhead bit data.

27 Claims, 5 Drawing Sheets

METHOD FOR MULTIPLEXING OF PARALLEL INFORMATION STREAMS IN A CDMA SYSTEM

BACKGROUND OF THE INVENTION

1. Technical Field of the Invention

The present invention relates to code division multiple access (CDMA) systems, and more particularly, to a method for multiplexing a plurality of variable rate parallel information streams in a CDMA system.

2. Description of Related Art

As mobile communications systems continue to develop, the requirements for high rate data transmission services within mobile communications systems are continuing to increase. Multimedia services, such as speech and video, and internet communications require several parallel and independent information streams to be transferred between a mobile station and a network over a single communications connection. The information streams may have different bit rates, different bit error rates, different delays, etc. Additionally, the parallel information streams may have variable bit rates for applications such as variable rate speech codecs and packet-switched data communications. This will require the information streams to have the ability to independently vary their bandwidth.

Direct sequence code division multiple access (DS-CDMA) is one of the multiple access candidates suitable for dealing with variable rate information streams. However, presently existing configurations for DS-CDMA have significant limitations which need to be overcome. DS-CDMA systems operating under the IS-95 protocol enable single code transmission with a fixed spreading factor. Thus, each communications connection is allocated a single code with a fixed nominal rate. Using the IS-95 protocol, up to three information streams (signaling, primary and secondary traffic) can be multiplexed together. However, the bit rate of each data stream cannot be independently chosen because the sum of the bit rates cannot exceed the nominal rate for the code channel. If the sum of the bit rate is smaller than the nominal rate, discontinuous transmission (DTX) is used.

The IS-95 protocol suffers from several drawbacks with respect to variable bit rate information streams. The bit rate for the IS-95 protocol is relatively low. Additionally, only a limited number of combinations of different data streams are defined by the protocol. Furthermore, explicit information concerning the combination of information streams being transmitted from the mobile station is only partially transmitted to the network. One solution for the low bit rate problem would be to extend the IS-95 protocol to include multi-code transmission. However, this would be a waste of codes, as on average, each stream only make partial use of the codes it had been allocated. Increasing the number of possible bit rates would be difficult since no explicit bit rate information is transmitted to the network.

The CODIT solution enables single code transmission with variable spreading. Under this solution, parallel variable rate information streams are separately coded and multiplexed into a physical data channel (PDCH). Information about the current characteristics of the different information streams of a connection is transmitted on a parallel, constant bit rate physical control channel (PCCH). The bit rate information transmitted on a PCCH during a 10 millisecond frame period refers to the information streams carried in the PDCH during the same 10 millisecond frame period. The PCCH and PDCH are transmitted on two separate code channels. For closed-loop power control the receiver measures the power of the PCCH enabling the receiver to avoid knowing the current PDCH bit rate in order to make a power control decisions.

The CODIT solution is not totally satisfactory since only a limited number of combinations of information streams are defined by the protocol. If a new combination or type En of information is needed, for example, a different set of rates for variable rate streams, the specification must be changed.

Another problem with the CODIT solution when applied to orthogonal code systems is related to how bit rate information is transferred to the receiver. First, it must be possible to decode the rate information even if the previous frame was erroneous. The CODIT solution with a in parallel constant-rate code channel is not desirable for a system with a limited number of orthogonal codes since the number of codes used must be minimized. Further, for a speech only terminal, using more than one code increases the complexity.

A final solution utilizes coherent wideband CDMA (CWCDMA). Coherent wideband CDMA is a multi-code transmission stream wherein each connection allocates one of several codes with a fixed nominal rate to a data stream. The concept is not completely developed in the sense that no manner of carrying out variable rate multi-code transmission has yet been presented. Rate information to the transceiver is time-multiplexed together with the information streams and transmitted over the same set of codes. While no implementation of multi-code transmission of parallel variable rate information streams has been described with respect to the CW-CDMA concept, one solution would be to transmit different information streams using different code sets.

However, this would be a waste of codes as each stream would only make partial use of its allocated codes. This is a serious problem in the downlink where there are only a limited number of orthogonal codes available. Another problem with this concept is that if a frame is received for which the bit rate information is unknown, the closed-loop power control can only be based on the fixed rate overhead portions in each slot, such as e.g. pilot symbols, for a DTX variable rate transmission. This provides worse performance than if all transmitted bits are used to measure received energy. Finally, in the case of a multi-code transmission, if the bit rate is unknown, then it is not known what codes are being used. Discontinuous transmission (DTX) involves the transmission of data at less than the nominal information bit rate of a system. In discontinuous transmissions the data is not transmitted over a user channel 100% of the time.

SUMMARY OF THE INVENTION

The present invention overcomes the foregoing and other problems with a method for transmitting a plurality of information streams having variable data rates. A plurality of data streams are multiplexed together to form a common information frame. A common information frame consists of single frame from each of the plurality of information streams. The number of bits within each of the frames included in the common information frame are converted to a binary representation and multiplexed into a bit rate information frame.

The bit rate information frame and common information frame are channel encoded and multiplexed into a single multiplexed frame. The multiplexed frame is then demultiplexed into at least one channel frames. Each channel frame is transmitted over a code channel. The multiplexed frame is demultiplexed in a manner such that the first code channel always includes the bit rate information for a multiplexed frame. The common information data of the multiplexed frame may be delayed one frame such that the bit rate information transmitted with a particular group of data is for the following frame of data.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
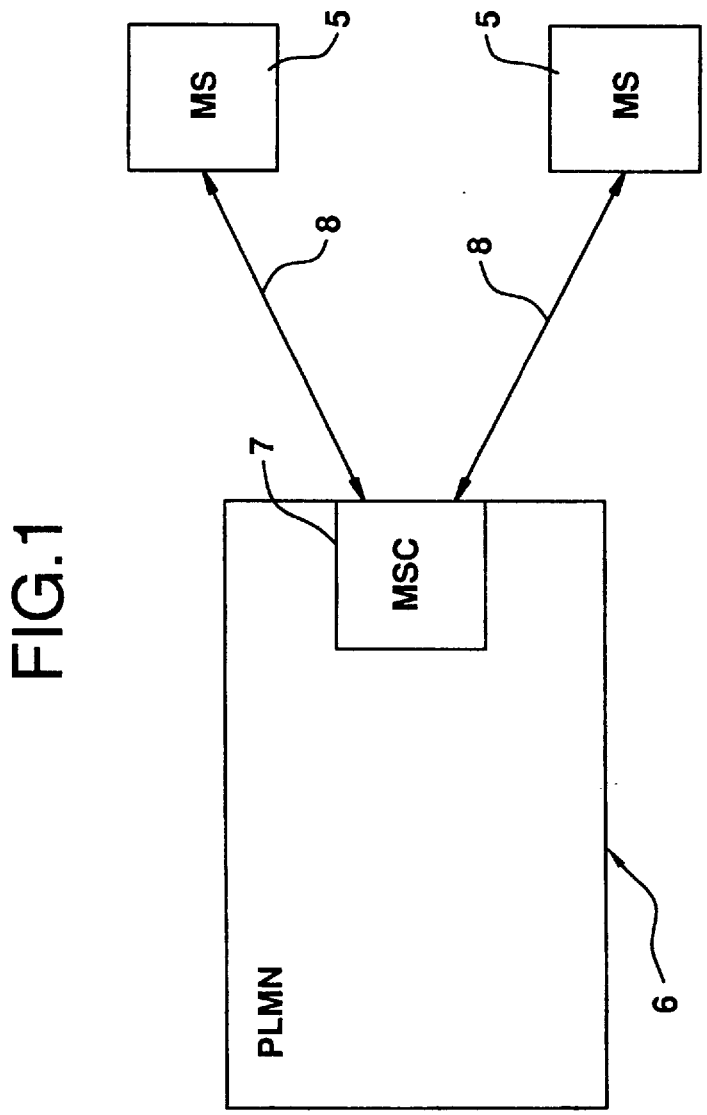
FIG. 1 is a block diagram illustrating communications between a mobile station and a public land mobile network.

Referring now to the drawings, and more particularly, to FIG. 1, there is shown a block diagram of a mobile station 5 and a public land mobile network 6 including a mobile switching center 7. When initially establishing a connection between a mobile station 5 and a public land mobile network 6, a connection including only a single predefined information stream 8 is first established. This information stream 8 is the dedicated control channel (DCCH) through which further signaling for setting up other data streams is performed. Through the DCCH 8, the number of information streams and the size of bit rate information frames are initially determined. Also during call setup, the manner of coding and interleaving of each information stream is determined.

The number of bits within a bit rate information frame is implicitly given by the size of the rate sets. The size of rate sets may be set by selecting a predefined combination of information streams each having a predefined set of rates. Alternatively, the rate sets may be selected by choosing any combination of information streams wherein the rate set is defined in terms of the number of bit rate levels and the number of bits per frame for each bit rate level.

Figure 2:
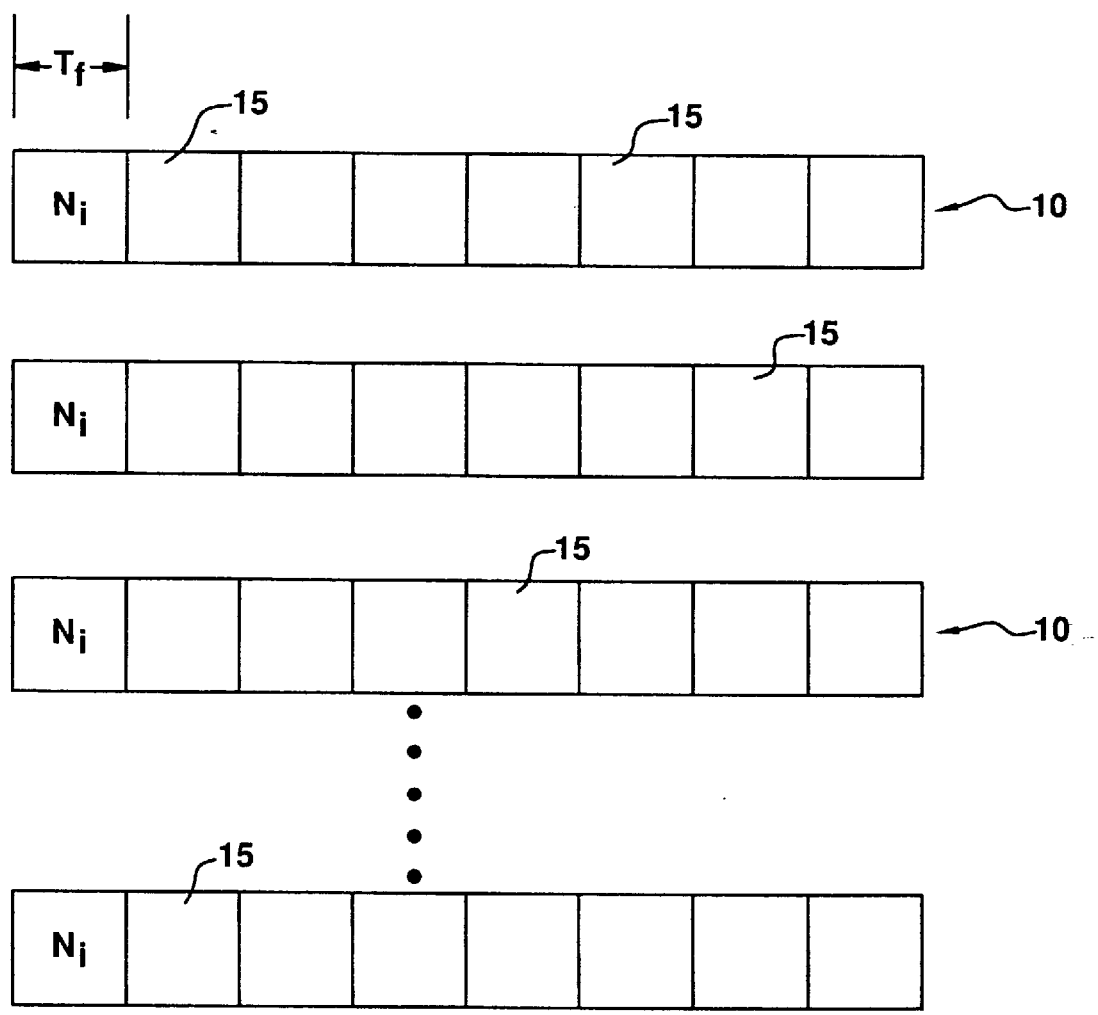
FIG. 2 illustrates an information stream.

Referring now to FIG. 2 there is illustrated and information stream 10. Each information stream 10 is synchronized such that each frame 15 has a frame interval length of $T_f$ seconds. $T_f$ is a system constant, typically in the range of 1 to 20 ms. $N_i$ (wherein i refers to information stream number i) information bits are contained within each frame interval of an information stream 10. The instantaneous bit rate for each information stream is defined by the equation $R_i = N_i / T_f$. For variable rate data streams, $N_i$ varies on a frame-by-frame basis.

Figure 3:
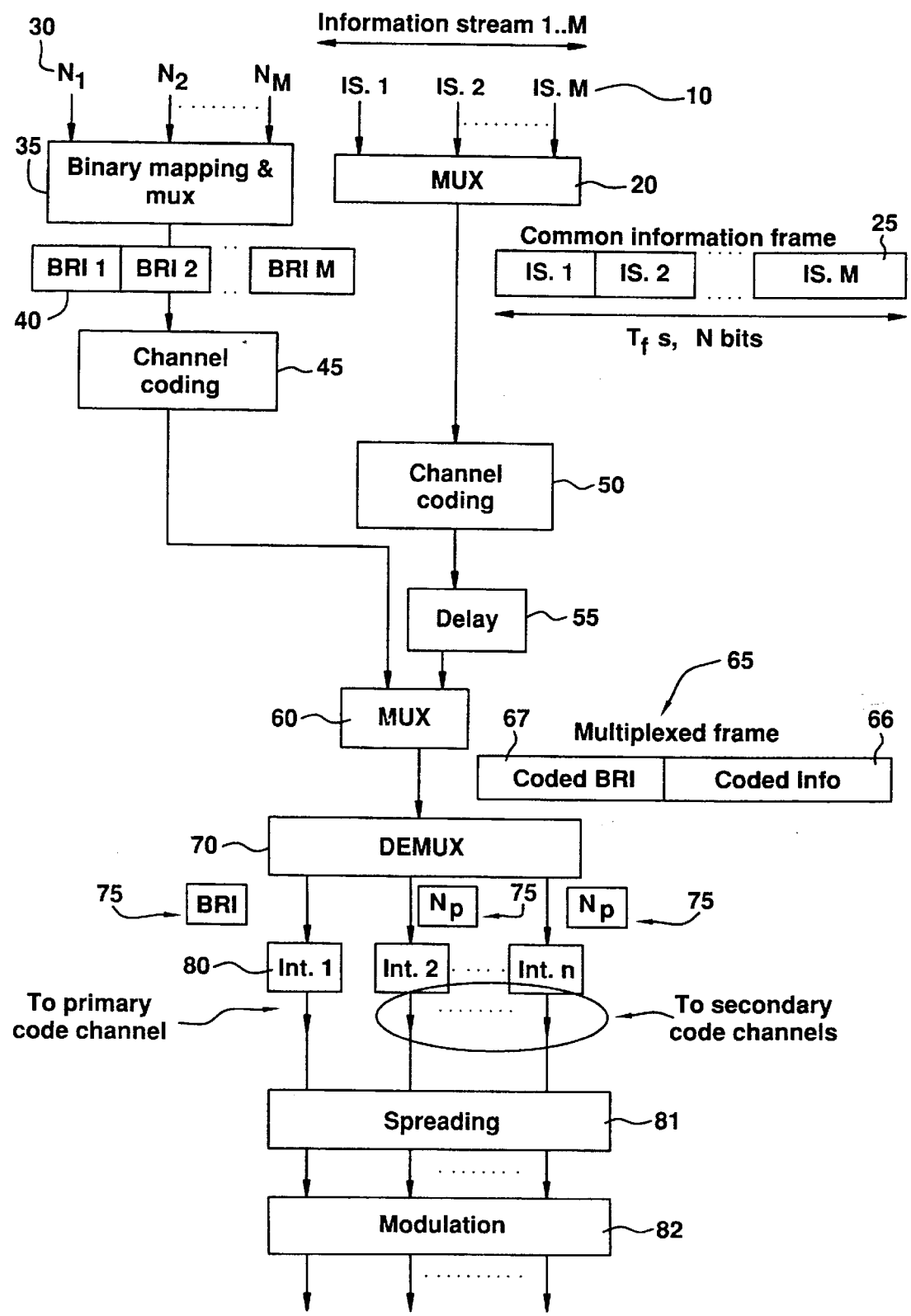
FIG. 3 is a block diagram illustrating the preferred embodiment of the method for multiplexing variable bit information streams for transmission from a mobile station to a public land mobile network.

Referring now also to FIG. 3 there is illustrated the preferred embodiment of the present invention. The bits of each information stream 10 to be transmitted arrive during a given frame interval $T_f$ and are multiplexed by a multiplexer 20 into a stream of common information frames 25. Each common information frame 25 consists of a single frame interval $T_f$ from each of the bit streams 10 during a particular frame interval. Simultaneously, the number of bits ($N_i$) 30 for each information stream 10 in the common information frame 25 are converted at block 35 to binary representations and multiplexed together into a bit rate information (BRI) frame 40. Thus, the BRI frame 40 consists of the converted and multiplexed number of bits for each frame of the information stream 10 in the common information frame 25.

The common information frame 25 and BRI frame 40 are each independently channel coded at blocks 50 and 45, respectively. The channel encoding process may include the steps of adding tail bits to the end of the time multiplexed information streams and/or encoding with a convolutional encoder at a predetermined rate. However, it should be realized that other types of channel encoding processes would be equally applicable to the invention as described.

The coded information frame 25 is optionally frame delayed at block 55 for one frame and then multiplexed with the coded BRI frame 40 by multiplexer 60. This creates a multiplexed frame 65 consisting of coded information stream data 66 and coded BRI data 67 for the coded information stream data of the next multiplexed frame. By frame delaying the coded information frame, the coded BRI portion 67 of the multiplexed frame will indicate the number of information bits in the next multiplexed frame. This enables the receiver to know the total number of bits to be received in the next frame. A receiver can use this information to estimate the received power of the signal and control the power output of the mobile station in order to receive a desired power level at the base station via closed-loop power control by measuring the received power and/or SIR for the port of each slot used by the transmitter. Alternatively, a coded information frame may be multiplexed with its own BRI portion 67.

The multiplexed frame 65 is demultiplexed at block 70 into code channel frames 75 having a fixed length of $N_f$ bits. However, there can be different types of code channels with different spreading ratios. Thus, the channel frames of one type of code channel may have a fixed length $N_{f1}$ while the channel frames of another type of code channel has a length $N_{f2}$. Zero padding bits may be applied to the last channel frame 75 if the length of the channel frame is not an exact multiple of $N_f$. Each coded channel frame 75 is separately block interleaved within a 10 ms frame period for transmission over an assigned code channel. Additional information and overhead, such as pilot symbols and power control commands, may be multiplexed into the channel frames either before or after interleaving at block 80.

Each interleaved channel frame has a unique spreading code applied thereto at block 81 and is modulated at block 82 onto a carrier for transmission from the base station. If zero padding has been applied to the final channel frame, the corresponding part of the code channel 75 containing the zero padding is not transmitted. Each channel frame is transmitter on a separate code channel.

If more than one code channel is used for transmitting the plurality of channel frames 75, the demultiplexing at block 70 of the multiplexed frame 65 into channel frames always allocates the BRI field 67 to the first code channel. This code channel is denoted as the primary code-channel since the BRI field 67 contains information informing the receiver at the base station how many, and possibly which code-channels are being used, and the number of bits included in the following frame. In order to better utilize available secondary code channels, the BRI field 67 may be extended to include the identity of the first secondary code channel which is used and the number of secondary code-channels to be used. This enables a dynamic allocation of code channels in consecutive blocks. This assures the number of code channels occupied at any particular time will equal the number of code-channels used. In this manner unnecessary code-channel usage is substantially reduced in both the forward and reverse links.

Figure 4:
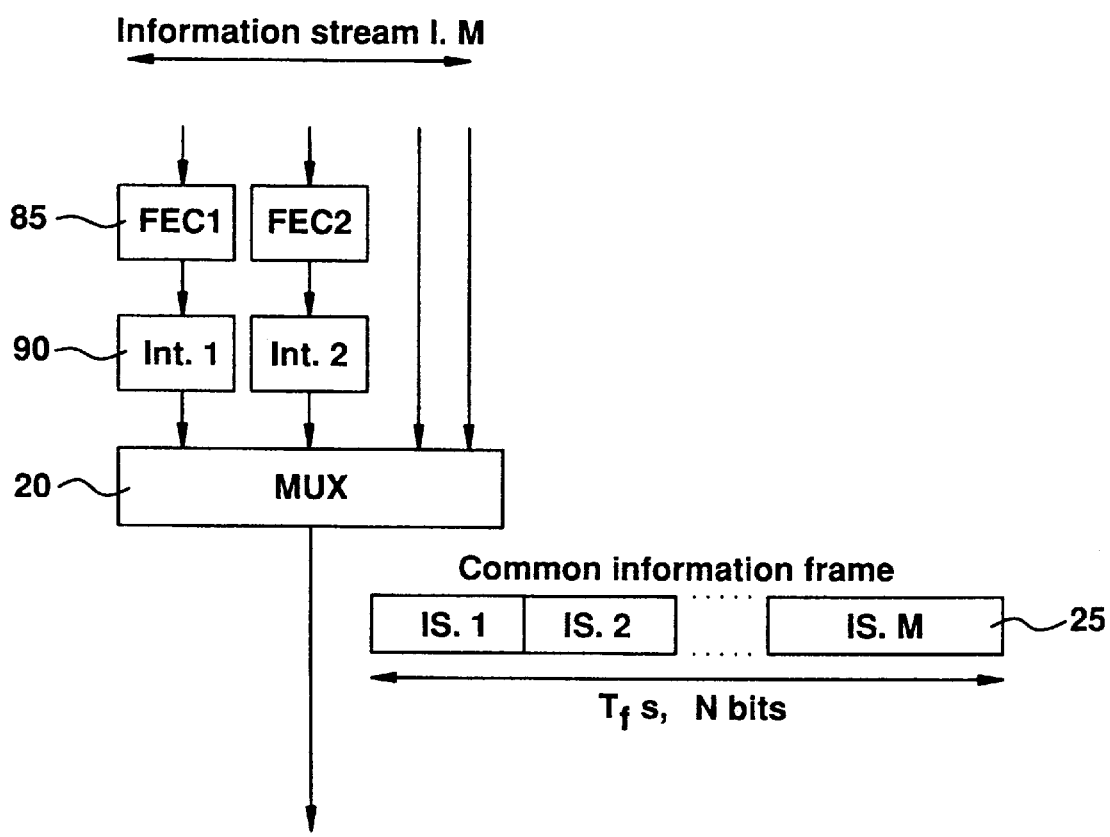
FIG. 4 is a block diagram illustrating a method for providing additional protection to information streams by forward error coding and interleaving prior to multiplexing into a common information frame.

The embodiment of FIG. 3, illustrates the channel coding of each information stream 10 with the same channel coding scheme. If more protection is needed for a particular information stream 10, additional coding in the form of forward error coding 85 and additional interleaving 90 may be included prior to multiplexing of the information streams at multiplexer 20 as shown in FIG. 4. Any additional coding and interleaving may be performed separately on particular streams and then multiplexed with the uncoded information streams into the common information frame 25.

Figure 5:
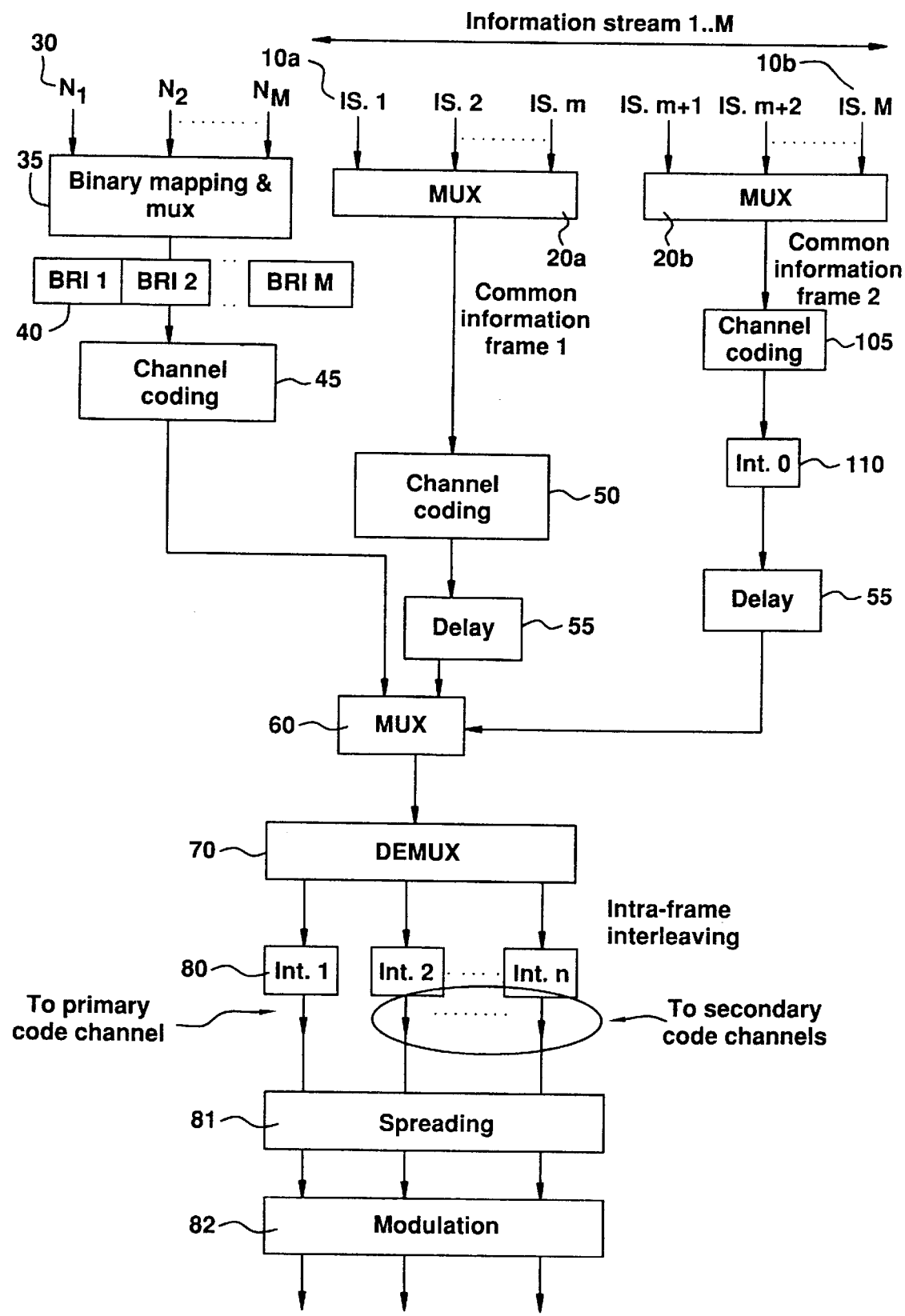
FIG. 5 illustrates an alternative embodiment of the invention wherein two common information streams have different inner coding and interleaving.

FIG. 5 illustrates an alternative embodiment of the invention wherein M common information streams 10*a* and 10*b* requiring different inner coding and interleaving are combined at multiplexer 60. The flexibility of the embodiment of FIG. 3 is achieved with the penalty that all information streams 10 must undergo the same interleaving and coding scheme. This can be limiting for information streams 10 that may gain performance by longer inner interleaving. This problem can be solved by having a small number parallel streams combined into a common information stream after separate coding and possibly multi-frame interleaving. One set of information streams 10*a* is multiplexed at 20*a* and subjected to a first inner channel coding 50 with one frame interleaving at 80. The other set of information streams 10*b* is multiplexed at 20*b* and subjected to a second channel coding rate 105 and a multi-frame interleaving 110. The two separately coded common information frames are then multiplexed together at block 60, as described previously.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for transmitting a stream of information frames having a variable number of bits but a fixed frame interval, comprising the steps of:

demultiplexing an information frame from the stream of information frames into at least one channel frames wherein all but one of the channel frames include the same number of bits and the one channel frame includes any remaining bits from the information frame not included in the at least one channel frames;

block interleaving within each of the at least one channel frames and the one channel frame; and transmitting each of the at least one channel frames and the one channel frame over a separate code channel.

2. A method for transmitting a plurality of information streams having variable data rates, comprising the steps of:

multiplexing the plurality of information streams together to form a common information frame, wherein the common information frame includes a frame from each of the plurality of information streams;

channel coding the common information frame;

multiplexing a fixed number of overhead bits to the channel encoded common information frame to form a multiplexed frame;

demultiplexing the multiplexed frame into at least one channel frames containing a fixed number of bits and a channel frame containing any remaining bits of the multiplexed frame not included in the at least one channel frames; and transmitting each of the at least one channel frames and the channel frame over a separate code channel.

3. The method of claim 2, further including the step of processing at least one of the information streams prior to multiplexing.

4. The method of claim 3 wherein the step of processing comprises forward error coding.

5. The method of claim 3 wherein the step of processing comprises interleaving.

6. The method of claim 2 wherein the step of channel encoding further comprises the step of convolutionally encoding the common information frame at a predetermined rate.

7. The method of claim 2 wherein the step of channel encoding further comprises the step of adding bits to an end of the multiplexed frames within the common information frame.

8. The method of claim 2 wherein the overhead bits include bit rate information for demultiplexing the multiplexed frame into the plurality of information streams.

9. The method of claim 8 wherein the bit rate information comprises a number of bits for each information stream in the following multiplexed frame.

10. The method of claim 9 bit rate information for the following information frame is used for improving closed loop power control in the next frame.

11. The method of claim 8, further including the step of encoding the bit rate information separately from the common information frame.

12. The method of claim 11 wherein the step of encoding comprises the step of convolutional encoding.

13. The method of claim 10 wherein the step of channel encoding further comprises the step of adding bits to an end of the multiplexed frames within the common information frame.

14. The method of claim 2 wherein the overhead bits are multiplexed to the channel encoded bits such that the overhead bits comprise a first channel frame of the at least one channel frames.

15. The method of claim 2, further including the step of interleaving the at least one channel frames and the channel frame prior to transmission on the code channels.

16. The method of claim 2, further including the step of predetermining the number of the plurality of information streams during a cellular call setup.

17. A method for transmitting a plurality of information streams having variable data rates, comprising the steps of:

multiplexing the plurality of information streams together to form a common information frame, wherein the common information frame includes a frame from each of the plurality of information streams;

multiplexing a value representing a number of bits in each of the frames included in the common information frame into a bit rate information frame;

channel coding the common information frame and the bit rate information frame;

multiplexing the common information frame with the bit rate information frame to form a multiplexed frame;

demultiplexing the multiplexed frame into at least one channel frames; and transmitting each of the at least one channel frames over a separate code channel, wherein the code channels include a primary code channel containing bit rate information.

18. The method of claim 17, further including the step of converting the value representing the number of bits for the frames included in the common information frame into a binary representation prior to multiplexing.

19. The method of claim 17, further including the step of processing at least one of the information streams prior to multiplexing.

20. The method of claim 17 wherein the bit rate information comprises a number of bits for each information we stream in the following multiplexed frame.

21. The method of claim 17, further including the step of encoding the bit rate information separately from the common information frame.

22. The method of claim 17 wherein the step of multiplexing the plurality of information frames further comprises the steps of:

multiplexing a first portion of the plurality of information streams into a first common information frame; and multiplexing a second portion of the plurality of information streams into a second common information frame.

23. The method of claim 22 wherein the step of channel encoding comprises the steps of:

channel coding the first common information frame according to a first channel coding rate; and channel coding the second common information frame according to a second channel coding rate.

24. The method of claim 23, further including the step of multi-frame interleaving the second common information frame.

25. A method for transmitting a plurality of information streams having variable data rates, comprising the steps of:

multiplexing a first portion of the plurality of information streams into a first common information frame;

multiplexing a second portion of the plurality of information streams into a second common information frame;

channel coding the first common information frame according to a first channel coding rate;

channel coding the second common information frame according to a second channel coding rate;

multi-frame interleaving the second common information frame;

multiplexing the first common information frame with the second common information frame and a fixed number of overhead bits to form a multiplexed frame;

demultiplexing the multiplexed frame into at least one channel frames; and transmitting each of the at least one channel frames over a separate code channel, wherein a primary code channel always contains a bit rate information frame.

26. The method of claim 25 wherein the overhead bits include bit rate information for demultiplexing the multiplexed frame into the plurality of information streams.

27. The method of claim 26 wherein the bit rate information comprises a number of bits for each information stream in the following multiplexed frame.

* * * * *

UNITED STATES PATENT AND TRADEMARK OFFICE
CERTIFICATE OF CORRECTION

PATENT NO. : 5,831,978
DATED : Nov. 3, 1998
INVENTOR(S) : Per Hans Åke Willars et al.

It is certified that error appears in the above-identified patent and that said Letters Patent is hereby corrected as shown below:

| | |
|---|---|
| Title Page, item [21] | Replace "731,756" With --08/731,756-- |
| Column 2, line 6 | Delete "En" |
| Column 2, line 13 | Delete "in" |
| Column 2, line 21 | Replace "CWCDMA" With --CW-CDMA-- |
| Column 7, line 15 | Delete "we" |

Signed and Sealed this

Twenty-fourth Day of April, 2001

Attest:

NICHOLAS P. GODICI

*Attesting Officer*  *Acting Director of the United States Patent and Trademark Office*